United States Patent [19]

Boyd

[11] Patent Number: 4,878,766

[45] Date of Patent: * Nov. 7, 1989

[54] HIGH SPEED SELF-LUBRICATING BEARING-SEAL ASSEMBLY

[75] Inventor: Richard M. Boyd, St. Louis Park, Minn.

[73] Assignee: Quadion Corporation, Minneapolis, Minn.

[*] Notice: The portion of the term of this patent subsequent to Jun. 14, 2005 has been disclaimed.

[21] Appl. No.: 235,438

[22] Filed: Aug. 25, 1988

[51] Int. Cl.$^4$ .......................... F16C 33/74; F16C 9/00; F16C 15/00

[52] U.S. Cl. .............................. 384/130; 277/206 A; 277/194; 277/168; 384/140; 384/153

[58] Field of Search ........................ 384/130, 138–140, 384/147, 152, 153, 144, 220, 273, 278, 301, 297, 906, 909; 277/194, 198, 199, 168, 170, 171, 176, 206 A, 187

[56] References Cited

U.S. PATENT DOCUMENTS

| | | |
|---|---|---|
| Re. 24,332 | 6/1957 | Svenson . |
| 1,361,471 | 12/1920 | Kozub . |
| 1,900,849 | 3/1933 | Ackerman . |
| 2,873,132 | 2/1959 | Tanner . |
| 2,909,398 | 10/1959 | Taylor . |
| 2,954,264 | 9/1960 | Tisch et al. . |
| 2,968,501 | 1/1961 | Tisch . |
| 2,983,533 | 5/1961 | Tisch ............................... 277/206 A |
| 3,076,683 | 2/1963 | Hanley . |
| 3,300,225 | 1/1967 | Shepler . |
| 3,322,433 | 5/1967 | Rentschler . |
| 3,418,001 | 12/1968 | Remtschler et al. ................. 277/165 |
| 3,421,412 | 1/1969 | Ackley . |
| 3,494,624 | 2/1970 | Woodling . |
| 3,542,380 | 11/1970 | Klein ............................... 277/180 |
| 3,622,168 | 11/1971 | Woodling ............................ 277/168 |
| 3,642,293 | 2/1972 | Woodling ....................... 277/206 A |
| 3,734,580 | 5/1973 | Piscitelli . |
| 3,776,611 | 12/1973 | Jentsch . |
| 4,020,910 | 5/1977 | Peterson et al. .................... 175/345 |
| 4,151,999 | 5/1979 | Ringel et al. ........................ 277/165 |
| 4,199,199 | 4/1980 | Granda ................................ 305/11 |
| 4,206,930 | 6/1980 | Thrane et al. ........................ 277/165 |
| 4,281,942 | 8/1981 | Gaeckle et al. . |
| 4,428,589 | 1/1984 | Reinsma ............................... 277/101 |
| 4,557,487 | 12/1985 | Banas et al. ........................... 277/12 |
| 4,580,790 | 4/1986 | Doose . |
| 4,750,847 | 6/1988 | Boyd .................................. 384/130 |
| 4,764,035 | 8/1988 | Boyd .................................. 384/152 |

FOREIGN PATENT DOCUMENTS

| | | |
|---|---|---|
| 2057027 | 5/1972 | Fed. Rep. of Germany . |
| 2432181 | 1/1976 | Fed. Rep. of Germany . |
| 627085 | 7/1949 | United Kingdom . |
| 762232 | 11/1956 | United Kingdom .......... 277/206 A |

Primary Examiner—Thomas R. Hannon
Attorney, Agent, or Firm—Schroeder & Siegfried

[57] ABSTRACT

A high-speed self-lubricating bearing-seal assembly comprised of an annular bearing-seal composed of readily moldable, self-lubricating, plastic material having a pressure velocity value at least equal to 1800 at 100 feet per minute surface speed, and an elastic combined spring and seal member biasing the bearing-seal. The elastic member is located behind the bearing-seal and is formed of a readily flowable rubber-like material, consisting of a combined spring and seal which gently urges the bearing-seal against a sealing surface. The elastic member is generally right-angled polygonal in cross-sectional shape and has concaved sides and convex corners, its minimum radial dimensions between the corners being 60–70% of its maximum radial dimensions. A salient feature of the assembly is that it is a dry bearing-seal, in that no lubrication is required other than that inherent in the bearing-seal member, yet it outlasts other lubricated bearings by a wide margin.

32 Claims, 2 Drawing Sheets

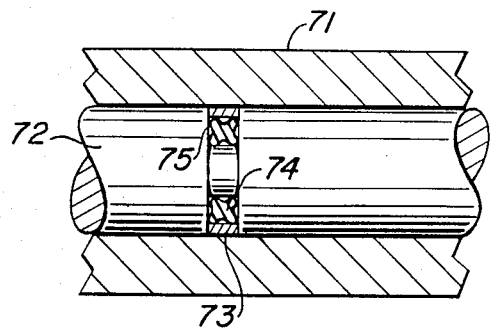
Fig. 7
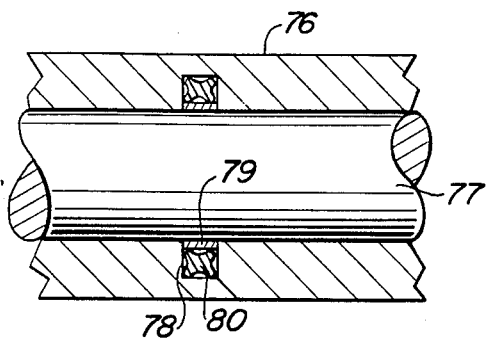
Fig. 8
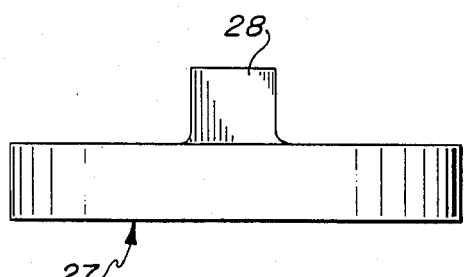
Fig. 9
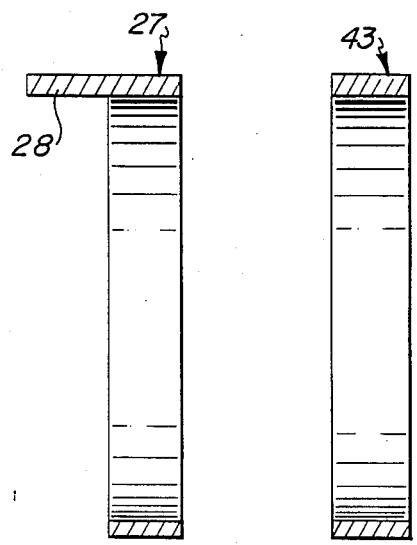
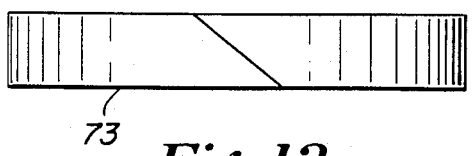
Fig. 11
Fig. 10     Fig. 12
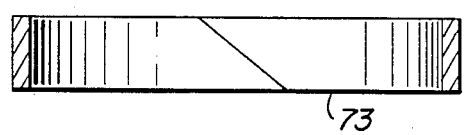
Fig. 13                    Fig. 14
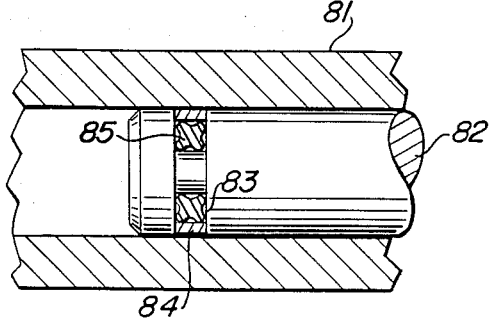
Fig. 15
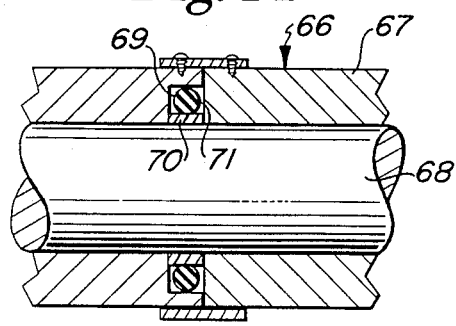
Fig. 16

HIGH SPEED SELF-LUBRICATING BEARING-SEAL ASSEMBLY

BACKGROUND OF THE PRIOR ART

This application is related to my application Ser. No. 117,802 entitled Molded Self-Lubricating Split-Ring Bearing Assembly, U.S. Pat. No. 4,764,035, and to my application Ser. No. 92,657 which has now matured into U.S. Pat. No. 4,750,847, entitled L-Shaped Bearing Assembly, each of which show constructions related to those shown and claimed herein. As described therein, high speed relative movement between metal parts over prolonged periods create serious lubrication problems because bearings for such parts are produced from metals which have widely different coefficients of thermal expansion as compared to the rotating part. Such differences require good lubrication for they cause expansion at different rates which together with high relative speeds generate heat which collectively may cause undue wear and/or loss of lubrication, unless the seal between the parts is adequately forgiving and therefore can adjust thereto.

As described in the two above applications, which are hereby incorporated herein by reference thereto, entire supplies of lubricant may be lost as a result of such differences when previously known bearings are utilized. Materials with self-lubricating qualities such as Teflon, are very expensive, non-moldable, and therefore necessarily are machined, and consequently are relatively expensive to manufacture. Even such bearings often suffer relatively short lives, particularly when subjected to more than light pressures which may be created when a wide variety of physical conditions are encountered. Thus, there is a clear need for a relatively inexpensive bearing-seal designed to function adequately without excessive wear under high speed for extended periods, over a wide range of operating conditions and manufacturing tolerances. A dry bearing-seal, such as is disclosed herein, offers immeasurably greater advantages. The bearing-seal assemblies disclosed and claimed herein constitutes such an assembly.

The computer industry today has need for an effective bearing-seal to prevent air and foreign particles from passing from the motor into the disk drive area. In such applications, a shaft is mounted within a housing in very close proximity to each other, but yet in slightly spaced relation. The shaft is provided with conventional sealed bearings at each of its ends. Means must be provided between said ends to preclude such passage of air or foreign particles into the disk drive area. Such means is critical and must have a long life span if it is to satisfactorily meet commercial requirements. The bearing-seal described and claimed herein is particularly well-adapted for this purpose because it is a dry seal, requiring no lubrication and lasting much longer than bearing-seals heretofore known.

BRIEF SUMMARY OF THE INVENTION

As partially disclosed in my above applications, I have discovered a way of producing a bearing-seal which overcomes the problems outlined hereinabove. My invention includes the manufacture, preferably by molding, of a bearing-seal member which is relatively thin and of a plastic material having inherent self-lubricating qualities with a pressure velocity value of at least 1800 at 100 feet per minute surface speed. Pressure velocity value is determined by multiplying the pressure applied to the sample in p.s.i. by the relative surface speed between the sample and the surface against which it bears, expressed in feet per minute. A pressure velocity value of 1800 or more at 100 feet per minute ensures adequate self-lubricating characteristics when utilized as disclosed and claimed herein.

A salient feature of my new bearing-seal assembly is the fact that it is a dry run, which means that a steel shaft, when equipped with one of my bearing-seal assemblies, may be rotated about its longitudinal axis, or reciprocated, within a conventional housing at high speeds over extended periods, without any lubrication other than that inherent in my bearing-seal member. My tests to date indicate that this new bearing-seal assembly outlasts by far bearings heretofore known, even when used with additional lubrication.

It is believed that one reason my new bearing-seal assembly functions in such an improved manner is that the combined spring and seal member disposed behind the bearing-seal member having the inherent lubricating qualities as specified, applies light but continuous radial pressure against the bearing-seal member so as to insure its ever present but light contact with the sealing surface opposite same. This combined spring and seal member is readily yielding or forgiving, because its minimum radial dimension between its corners is only 60-70% of its maximum radial dimension. This combination of dimensions provides for ready flow of the elastomeric material, of which the combined spring and seal member is composed, from the corner lobes into the concavities therebetween when only slight radial pressure is applied thereto, and thus a light but constant pressure against the pressure-receiving side of the bearing-seal member is assured.

As indicated above, our tests to date show marked performance improvements for my new bearing-seal assembly over bearings heretofore utilized in the same applications. This fact, plus the fact my bearing-seal assembly is moldable of relatively reasonably priced materials, offers marked improvement, advantages and savings to the trade. Described hereinafter, in more specific detail, are a number of examples of my invention which illustrate various applications thereof.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 7 is a vertical sectional view of a single-part housing with a single-part shaft mounted therein for high speed relative movement, the bearing-seal member being split and without a tang and the bearing-seal assembly being mounted within the shaft;

FIG. 8 is a vertical sectional view of a single-part housing with a single-part shaft mounted therein for high speed relative movement, the bearing-seal member being split and without a tang and the bearing-seal assembly being mounted within the housing;

FIG. 9 is a plan view of the continuous bearing-seal member with a tang, as shown in FIG. 1;

FIG. 10 is a transverse vertical sectional view taken through the bearing-seal member of FIG. 9;

FIG. 11 is a plan view of the continuous bearing-seal without a tang, as shown in FIG. 3;

FIG. 12 is a transverse vertical sectional view taken through the bearing-seal of FIG. 11;

FIG. 13 is a plan view of the split ring bearing-seal member without a tang, as shown in FIGS. 7 and 8;

FIG. 14 is a transverse sectional view of the bearing-seal member of FIG. 13;

FIG. 15 is a fragmentary vertical sectional view of a piston assembly with a cylinder, with a piston therein having a split-ring bearing-seal member;

FIG. 16 is a fragmentary vertical sectional view of a bearing-seal assembly within a sectional housing surrounding a shaft mounted for relative high speed movement, the assembly utilizing an 0-ring behind the bearing-seal member.

DETAILED DESCRIPTION OF THE INVENTION

This application is related to my earlier application which is now matured into U.S. Pat. No. 4,750,847 and my two pending applications, Ser. No. 117,802 and entitled Molded Self-Lubricating Split-Ring Bearing Assembly and Ser. No. 106,445, entitled Elastomeric Combined Seal and Spring, each of which is hereby incorporated herein by reference thereto. This application is directed to additional applications which utilize a readily moldable self-lubricating plastic bearing-seal member having a pressure velocity value at least equal to 1800 at 100 feet per minute surface speed with a elastomeric combined spring and seal member biasing the bearing-seal. FIGS. 1–6 hereof show such a bearing-seal member which is continuous and is mounted within support structure in the form of a shaft and housing, one of which is split or sectionalized. The bearing-seal member is continuous, in contrast to the bearing-seal members disclosed and claimed in my above Patent and pending applications.

FIGS. 7–8 discloses a split bearing-seal member mounted within the support structures similar to that shown in FIGS. 1–6 except that neither of the support structure elements is split or sectionalized and the bearing-seal member is of a split ring construction.

FIGS. 9–12 show plan and sectional views of the continuous bearing-seal of FIGS. 1–6 while FIGS. 13–14 show plan and sectional views of the split ring of FIGS. 7–8. FIG. 15 shows a piston with a split ring bearing-seal mounted therein. FIG. 16 shows an assembly similar to FIG. 1–6, with continuous bearing-seal and sectional support structure, and a conventional 0-ring utilized as a combined spring and seal.

Figure 1:
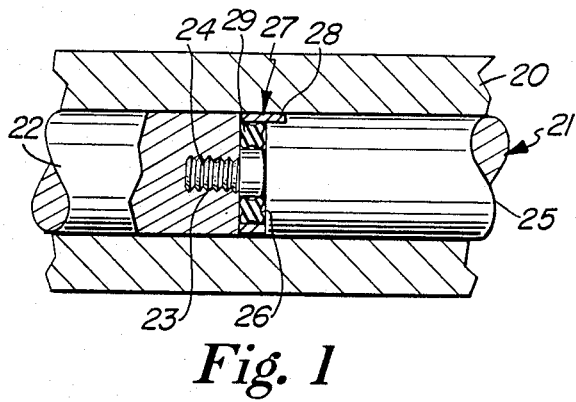
FIG. 1 is a fragmentary vertical sectional view of a continuous bearing-seal assembly including a two-part shaft mounted for high speed movement relative to its housing, with the shaft shown in elevation and with a portion broken away.

The construction shown in FIG. 1 includes support structure comprised of a housing member 20 in which a sectional shaft 21 is mounted for high speed motion relative to the housing. This motion may be either longitudinal or rotary about its longitudinal axis. As shown, the shaft 21 is comprised of one section 22 which is tapped as at 23 to receive a threaded end 24 of the other section 25 of the shaft. The end of the section 25 which carries the threaded portion 24 is relieved as at 26 to provide a groove within the shaft 21 designed to accept and receive the bearing-seal assembly to be hereinafter described.

Mounted within the groove 26 is a continuous annular bearing-seal member 27 which is of uniform radial dimensions throughout in cross-section, as shown in FIG. 10, and has a tang 28 which extends axially outwardly from one of its sides into a small opening provided therefore within the shaft section 25. This tang 28 precludes relative circumferential movement between the bearing-seal 27 and the shaft. The outer circumferential surface of the bearing-seal 27 is equal to the inner surface of the tubular housing 20.

Mounted behind the bearing-seal 27 is an elastomeric combined spring and seal 29. This combined spring and seal 29 is made of readily flowable material such as rubber and is preferably polygonal in cross section, of substantially equal transverse dimensions, and is provided with convex corners lobes and opposed concave sides, the degrees of concavity and convexity of which and the maximum and minimum radial dimensions of which have predetermined values within critical ranges as described in my above pending application, Ser. No. 106,445.

The bearing-seal member 27 is continuous and molded of plastic material having inherent self-lubricating qualities with a pressure velocity of no less than 1800 at 100 feet per minute surface speed. This is the same material as identified in my above patent and pending applications. As pointed out herein, this material has a very high self-lubricating inherent quality. I have discovered that when it is installed in combination with the elastomeric combined spring and seal dimensioned, as disclosed herein, such a seal can be run dry without other lubrication for extended periods far in excess of bearings heretofore known.

The elastomeric combined spring and seal 29 is properly dimensioned as described in my pending application Ser. No. 106,445. Accordingly, its minimum radial dimensions are preferably 60–70% of its maximum radial dimensions and the radius of concavity of the concave sides approximates 24–33% of such maximum radial dimensions. This continuous ring may have minimum radial dimensions as great as 75% of its maximum radial dimensions, but such a ring does not function nearly as well as when the said radial dimensions are maintained within the 60–70% range.

Figure 2:
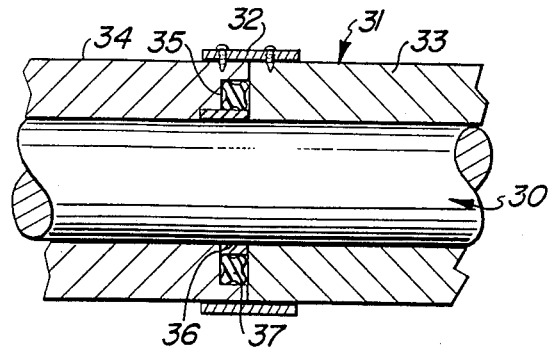
FIG. 2 is a fragmentary vertical sectional view of a two part housing having one of my continuous bearing-seal assemblies mounted therein, with the shaft shown therein in elevation.

FIG. 2 is similar to FIG. 1 except that the groove is formed in the housing and the housing is sectionalized, rather than the shaft. The shaft 30 is mounted for high speed movement relative to the sectionalized housing 31, the sections of which are held together by securing means 32. One section of the housing 31 is identified by the numeral 33 and the other section 34 has a groove 35 formed in its inner end to accommodate the continuous annular bearing-seal 36 and the elastomeric combined spring and seal 37. The bearing-seal 36 and the combined spring and seal 37 are manufactured of the same materials as the bearing-seal 27 and ring 29 although, of course, the latter is of larger diameter because its interior surface bears upon the exterior surface of the bearing-seal 36 rather than the interior surface, as shown in FIG. 1.

Figure 3:
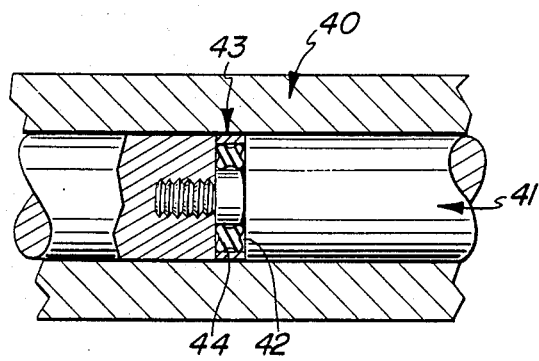
FIG. 3 is a view similar to that shown in FIG. 1, except that the bearing is shown without a tang.

FIG. 3 shows the same support structure as shown in FIG. 1. This support structure includes the housing 40 and a sectionalized shaft 41, the latter being constructed identically to the shaft 21. The shaft 41 has a groove 42 formed therein to accommodate a continuous annular bearing-seal member 43 and an elastomeric combined spring and seal 44 therebehind. The latter and the bearing-seal 43 are constructed indentically to the bearing-seal and spring of FIG. 1 except that it is constructed without a tang. It will be noted that it is of uniform radial dimensions throughout its length. It should be noted that the combined spring and seal shown in each of the FIGS. herein is of slightly lesser axial dimensions than the width of the groove in which it is mounted.

Figure 4:
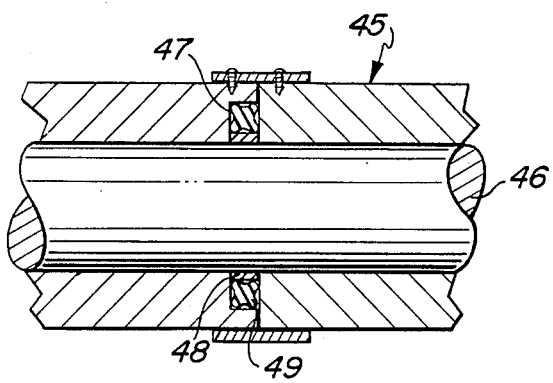
FIG. 4 is a view similar to that shown in FIG. 2, except that the bearing member is shown without a tang.

FIG. 4 shows a support structure similar to that shown in FIG. 2 except that no provision is made for a tang in the bearing-seal. As shown, it includes a sectionalized housing 45 and a shaft 46 mounted for high speed movement relative thereto. A groove 47 is formed in one of the sections of the housing to accommodate a continuous annular bearing-seal 48 which is biased radially inwardly by continuous elastomeric combined spring and seal 49. The bearing-seal 48 and the combined spring and seal 49 are manufactured in essentially the same manner and of the same materials and have the same relationship as those shown and described herein with respect to FIGS. 1–3. The combined spring and seal in each instance is mounted under slight radial compression so as to cause the bearing-seal member to bear against the sealing surface of the support structure opposed thereto.

Figure 5:
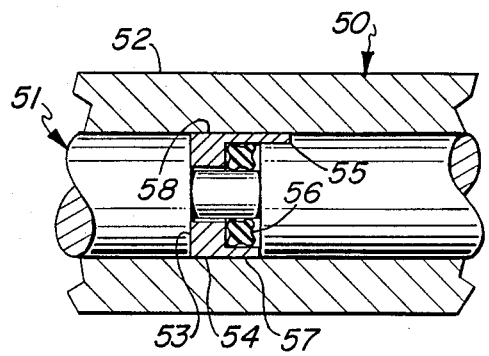
FIG. 5 is a view similar to that shown in FIG. 1, except that the bearing member is L-shaped in cross-section.

FIG. 5 shows support structure 50 in which the shaft 51 is sectionalized as shown in FIG. 1 and has a groove 53 formed therein adapted to accommodate bearing-seal 54 which is L-shaped in cross-section throughout its length and includes a tang 55. The bearing-seal 54 is continuous throughout its length and is constructed of the same material as the bearings hereinbefore described and, likewise, is molded. An elastomeric combined spring and seal 56 is mounted within the groove behind and within the portion of the bearing-seal 54 which is of lesser radial dimension and is under slight radial compression so as to continuously apply slight pressure to the bearing-seal member which transmits such pressure against the sealing surface of the housing opposite thereto. Thus, the bearing-seal has a sealing surface 57 opposite to and bearing against the sealing surface 58 of the housing.

Figure 6:
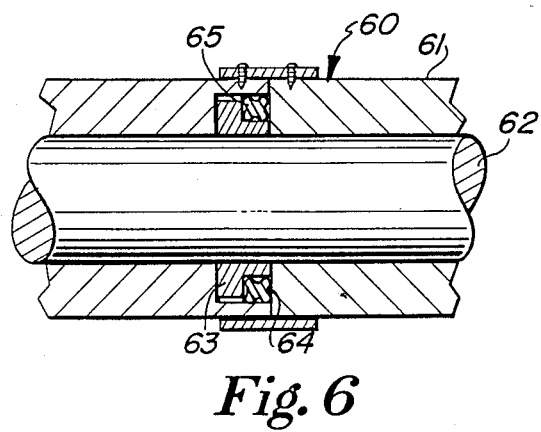
FIG. 6 is a view similar to that shown in FIG. 2, except that the bearing member is L-shaped in cross-section.

FIG. 6 shows support structure 60 similar to that shown in FIG. 5 except that the housing 61 is sectionalized instead of the shaft 62, as is the case in FIG. 5. The same L-shaped bearing-seal 63 is mounted within the groove 64 and the elastomeric combined spring and seal 65 is mounted behind the portion of the bearing-seal having the lesser radial dimensions in pressure-applying relation so that the inner diameter sealing surface of the bearing-seal 63 is brought to bear gently against the exterior sealing surface of the shaft 62.

FIG. 16 shows a support structure 66 which includes a sectionalized housing 67 and a shaft 68 mounted therewithin for high speed relative movement. As shown, there is a groove 69 formed in one of the sections of the housing 67 and a continuous bearing-seal 70 is mounted therewithin with a conventional O-ring 71 encircling the same and bearing thereagainst while under slight radial compression. While a construction such as this will not function as well as those shown in FIGS. 1–6 inclusive, this particular combination does constitute an improvement over other bearings heretofore known.

FIG. 7 shows support structure in the form of housing 71 and shaft 72. A split ring bearing-seal 73 and a continuous elastomeric combined spring and seal 74 is mounted within a groove 75 formed within the shaft. The split bearing-seal member 73 does not include a tang and therefore the bearing-seal member is free to rotate with the shaft 72.

FIG. 8 shows a bearing-seal similar to that shown in FIG. 7 but different in that the groove is formed in the housing 76 instead of in the shaft 77. The groove 78 accomodates a split ring bearing-seal 79 which is urged inwardly by the elastomeric combined spring and seal 80 which encircles the bearing-seal 79 and is compressed slightly in a radial direction so as to urge the sealing surface of the bearing-seal against the sealing surface of the shaft 77 lightly.

FIG. 15 shows a cylinder 81 with its piston 82 having a groove 83 formed therein to accomodate a split ring bearing-seal 84 which is rectangular in cross-section and is urged outwardly against the sealing surface of the housing by an elastomeric combined spring and seal 85 which is mounted therebehind. The bearing-seal 84 is manufactured of the same materials as that of which the other bearings described herein are comprised and is molded. The combined spring and seal 85 is manufactured of the same materials as those described with respect to the other combined spring and seals shown herein and with the same proportions. In fact, each of the combined spring and seal shown and described herein, with the exception of the O-ring 71, has the same relative dimensions and shape. Also, each of the bearing-seal shown and described herein is molded and is comprised of the same materials as described with respect to that shown in FIG. 1.

I have found that the bearing-seals disclosed and claimed herein are highly superior to those heretofor known and can be manufactured and sold at a substantial savings over bearings heretofore machined and utilized. Much to my surprise, I have found that bearing-seals of the type shown and claimed herein can be run dry without the use of additional lubricant and that such bearing-seals will perform for much longer periods than those heretofore known. The tests which we have performed to date indicate that these bearing-seals will in all likelihood enjoy a life span approaching 10 times the life span of bearings heretofore commonly in use in the industry. In each case, the elastomeric combined spring and seal is dimensioned so that its surface which bears against the bearing-seal is equal to that bearing surface and circumference, and the surface of the bearing-seal which bears against the sealing surface of the support structure is of the same dimensions as that of the sealing surface of the support structure. Thus, the only pressure which is applied to the sealing surface of the bearing-seal is transmitted to, and imposed thereupon, by the supporting combined spring and seal disposed therebehind for the purpose of applying slight radial pressure against the bearing-seal and sealing surfaces. The forgiving nature of the combined spring and seal maintains the seal between the two sealing surfaces without applying undue pressure and consequent wear thereto. At the same time it precludes the passage of fluid around the bearing-seal member.

It will, of course, be understood that various changes may be made in the form, details, arrangement and proportions of the parts without departing from the scope of the invention which consists of the matter shown and described herein and set forth in the appended claims.

What is claimed is:

1. A self-lubricating bearing-seal assembly comprising:
   (a) a molded annular bearing-seal member comprised of readily moldable plastic material having inherent self-lubricating qualities with a pressure-velocity value of no less than 1800 at 100 feet per minute surface speed;
   (b) said bearing-seal member being of uniform radial dimensions throughout its cross-section and having a sealing surface and a pressure-receiving surface opposite to and spaced radially from said sealing surface;
   (c) support-structure mounted in supporting relation to said bearing-seal member and having a sealing surface opposite same and having an annular groove formed therein opposite said surfaces and in the same radial plane as said bearing-seal member;
   (d) a continuous annular combined spring and sealing member mounted under slight radial compression within said groove in supporting relation to said bearing-seal member and being of lesser radial dimension than said groove;
   (e) said combined spring and sealing member being formed of uniformly resilient, flowable rubber-like material throughout and bearing against said pressure-receiving surface of said bearing-seal member in radial pressure-applying relation;
   (f) the combined radial dimensions of said bearing-seal member and said combined spring and sealing member in its free-form being slightly in excess of the depth of said groove whereby said combined spring and sealing member maintains said bearing-seal member under slight compression against said support-structure sealing surface at all times; and
   (g) said combined spring and sealing member having maximum axial dimensions slightly less than the axial dimensions of said groove.

2. The structure defined in claim 1 herein said support-structure is devoid of lubrication other than that inherent in said bearing-seal member.

3. The structure defined in claim 1, wherein said combined spring and sealing member is ring which is generally rectangular in cross-sectional configuration and has radially spaced sides intermediate its corners, the minimum radial dimensions between said sides being 60%–70% of the maximum radial dimensions of said ring in cross-section.

4. The structure defined in claim 1 wherein said support-structure is comprised of a cylinder head and a piston mounted within said cylinder head.

5. The structure defined in claim 1, wherein said support-structure is comprised of a cylinder-head and a piston mounted within said cylinder-head, and said bearing-seal member is a split-ring having free-end portions movable relative to each other.

6. The structure defined in claim 1 wherein said combined spring and sealing member is circular in cross-sectional configuration.

7. The structure defined in claim 1, wherein the minimum radial dimensions of said spring and sealing member are 60–70% of the maximum radial dimensions thereof.

8. The structure defined in claim 1, wherein said bearing-seal member is generally rectangular in cross-sectional configuration.

9. The structure defined in claim 1, wherein said bearing-seal member is generally L-shaped in cross-sectional configuration.

10. The structure defined in claim 1, wherein said bearing-seal member is continuous throughout its circumferential length.

11. The structure defined in claim 1, wherein said bearing-seal member is a split ring and has free ends movable relative to each other.

12. The structure defined in claim 1, wherein said sealing surface of said bearing-seal member is at the outer diameter of said bearing-seal member.

13. The structure defined in claim 1, wherein said sealing surface of said bearing-seal member is at the inner diameter of said bearing-seal member.

14. A high-speed self-lubricating bearing-seal assembly comprising:
   (a) a shaft member constructed and arranged to be moved at high speed with respect to its longitudinal axis and having opposite ends;
   (b) a housing member surrounding said shaft and having opposite ends and being constructed and arranged to support said shaft member as the latter moves at such high speed relative to said housing member;
   (c) one of said members having a sealing surface and the other of said members having an annular groove formed therein intermediate its ends and opposite said sealing surface;
   (d) a molded annular self-lubricating bearing-seal disposed within said groove and being formed of moldable self-lubricating material having a pressure velocity value at least equal to 1800 at 100 feet per minute surface speed;
   (e) said bearing-seal having a sealing surface, and a pressure-receiving surface spaced radially from and opposite to said sealing surface;
   (f) said sealing surface of said bearing-seal engaging said sealing surface of said members and having a free-form circumference substantially equal thereto and bearing thereagainst;
   (g) an elastomeric combined spring and sealing ring mounted behind said bearing-seal and within the bottom of said groove and having a lesser radial thickness than said groove, and being made of uniformly resilient, flowable rubber-like material;
   (h) said combined spring and sealing ring bearing against said pressure-receiving surface of said bearing-seal and thereby perfecting a seal between said members;
   (i) the axial dimensions of said combined spring and sealing ring being less than the axial width of said groove;
   (j) the combined free-form radial dimensions of said combined spring and sealing ring and said bearing-seal being only slightly greater than the radial dimensions of said groove, whereby said combined spring and sealing ring and said bearing-seal are maintained under only slight radial compression within said groove despite said high-speed movement of said shaft and a seal between said members is thereby perfected and maintained.

15. The structure defined in claim 14, wherein said bearing-seal is continuous throughout its circumferential length.

16. The structure defined in claim 14, wherein said bearing-seal is comprised of a split-ring having adjacent ends shiftable relative to each other.

17. The structure defined in claim 14, wherein said bearing-seal is comprised of a split-ring having adjacent ends shiftable relative to each other and being of uniform axial dimensions throughout its entire circumferential length.

18. The structure defined in claim 14, wherein said bearing-seal is of constant radial thickness throughout.

19. The structure defined in claim 14, wherein said bearing-seal is generally L-shaped in cross-sectional configuration.

20. The structure defined in claim 14, wherein the minimum radial dimensions of said spring and sealing ring are 60–70% of the maximum radial dimensions thereof.

21. A high speed self-lubricating bearing-seal assembly comprising:
  (a) a shaft member constructed and arranged to be moved at high speed with respect to its longitudinal axis;
  (b) a housing member surrounding said shaft and constructed and arranged to contain fluid in surrounding and lubricating relation to said shaft member as it moves at high speed relative to said housing members;
  (c) one of said members having a sealing surface and the other of said members being comprised of at least two separate but connected axially extending sections having abutting ends defining an annular groove therebetween opposite said sealing surface;
  (d) a molded annular self-lubricating bearing-seal disposed within said groove and being formed of moldable self-lubricating material having a pressure velocity value at least equal to 1800 at 100 feet per minute surface speed;
  (e) said bearing-seal having a sealing surface, and a pressure-receiving surface spaced radially from and opposite to said sealing surface;
  (f) said sealing surface of said bearing-seal engaging said sealing surface of said members and having a free form circumference equal thereto and bearing thereagainst;
  (g) an elastomeric combined spring and sealing ring mounted behind said bearing-seal and within the bottom of said groove and having a lesser radial thickness than said groove, and being made of a uniformly resilient, flowable rubber-like material;
  (h) said ring bearing against said pressure-receiving surface of said bearing-seal and thereby perfecting a seal between said members;
  (i) the axial dimensions of said combined spring and sealing ring being less than the axial width of said groove;
  (j) the combined free-form radial dimensions of said combined spring and sealing ring and said bearing-seal being only slightly greater than the radial dimensions of said groove, whereby said combined spring and sealing ring and said bearing-seal are maintained under only slight radial compression within said groove despite said high-speed movements of said shaft and a seal between said members is thereby perfected and maintained.

22. The structure defined in claim 21, wherein said annular bearing-seal has a constant radial thickness throughout its circumferential length.

23. The structure defined in claim 21, wherein said annular bearing-seal is L-shaped in cross-sectional configuration.

24. The structure defined in claim 21, wherein said annular bearing-seal is continuous throughout its circumferential length.

25. The structure defined in claim 21, wherein said annular bearing-seal is of split-ring construction and has free-ends movable relative to each other.

26. The structure defined in claim 21, wherein said annular bearing-seal includes a tang extending axially outwardly therefrom into one of said abutting ends of said member in which said groove is defined to positively preclude rotation of said bearing-seal relative to said member.

27. The structure defined in claim 21, wherein said annular bearing-seal has uniform axial dimensions throughout its circumferential length.

28. The structure defined in claim 21, wherein said shaft member rotates at high speed about its longitudinal axis.

29. The structure defined in claim 21, wherein said shaft member reciprocates relative to said housing member at high speed and along its longitudinal axis.

30. The structure defined in claim 21, wherein said combined spring and sealing ring is generally rectangular in cross-section and has concaved sides and convex corner lobes and the minimum radial dimensions thereof are 60%–70% of the maximum radial dimensions thereof.

31. The structure defined in claim 21, wherein said combined spring and sealing ring is generally rectangular in cross-section and has concaved radially spaced sides and convex corner lobes and the radius of concavity of said sides is 24%–30% of the maximum radial dimensions of said ring.

32. The structure defined in claim 21, wherein said combined spring and sealing ring is generally rectangular in cross-section.

* * * * *

UNITED STATES PATENT AND TRADEMARK OFFICE
CERTIFICATE OF CORRECTION

PATENT NO. : 4,878,766
DATED : Nov. 7, 1989
INVENTOR(S) : Richard M. Boyd

It is certified that error appears in the above-identified patent and that said Letters Patent is hereby corrected as shown below:

Claim 3, Line 52, add "a" after --is--.

Signed and Sealed this

Twenty-fifth Day of December, 1990

Attest:

HARRY F. MANBECK, JR.

*Attesting Officer*     *Commissioner of Patents and Trademarks*